Dec. 18, 1962 J. G. JONES 3,069,499

TELEVISION SYNCHRONIZING SYSTEM

Filed Nov. 16, 1960

2 Sheets-Sheet 1

JOEL GRAYSON JONES,
INVENTOR.

BY Barlow & Lewis

INVENTOR.
JOEL GRAYSON JONES,
BY Barkelew & Lewis

United States Patent Office 3,069,499

Patented Dec. 18, 1962

3,069,499
TELEVISION SYNCHRONIZING SYSTEM

Joel Grayson Jones, Glendora, Calif., assignor, by mesne assignments, to Giannini Controls Corporation, Duarte, Calif., a corporation of New York Filed Nov. 16, 1960, Ser. No. 69,627
20 Claims. (Cl. 178—69.5)

Figure 1:
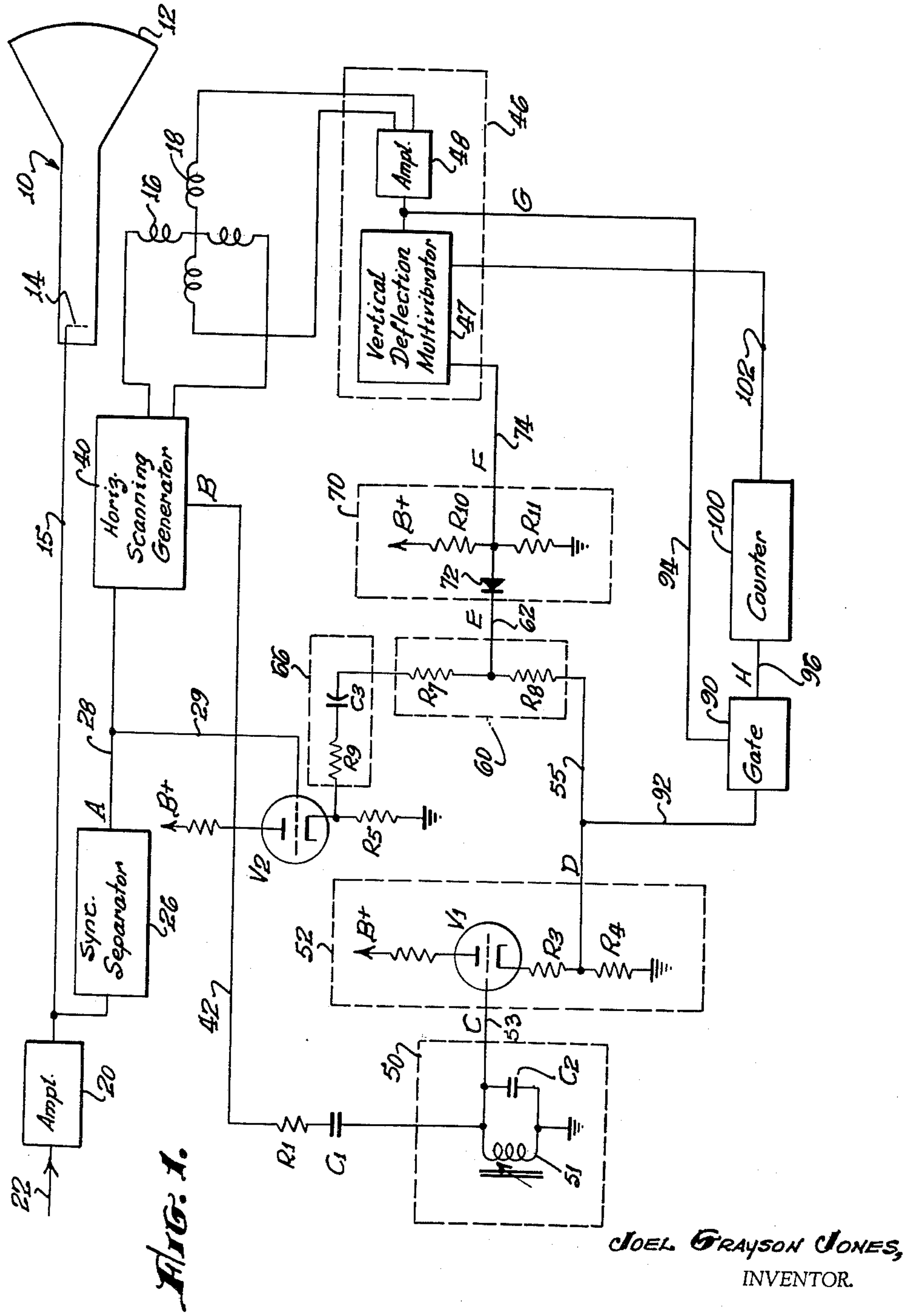

The present invention has to do generally with television synchronizing systems, and provides improved means for timing the vertical retrace movement of the scanning beam.

An important object of the invention is to provide accurate and reliable timing of the vertical retrace, suitable for both camera and display systems, under control of a composite synchronizing signal which may be of conventional type.

The invention relates more particularly to television systems wherein the horizontal scanning lines of successive fields are interlaced. For a given number of lines per field, such interlace doubles the effective number of horizontal lines that form each complete picture, theoretically doubling the vertical resolution or definition of the picture.

In actual practice, however, considerable difficulty is experienced in obtaining accurate and consistent interlace. Even slightly inaccurate spacing of the lines of successive fields is detectable visually, giving a distinct appearance of pairing of the lines. With slight misadjustment of present synchronizing systems, in television display units, it is quite common for the lines of successive fields to be directly superposed, eliminating interlace altogether. And present techniques require supply to television cameras of a plurality of synchronizing signals over separate conductors.

A primary object of the invention is to provide more accurate and reliable interlace, free from such usual defects as extreme sensitivity of adjustment. That is accomplished by producing sharp and accurate timing signals for controlling the vertical retrace movement. Distinct signals are preferably provided for initiating and for terminating the retrace, thereby positively controlling the duration of the retrace movement. Since the timing signals provided by the invention are relatively insensitive to disturbing influences, such as external noise and interaction between circuits within the set, the resulting control produces more accurate and reliable interlace.

An important cause of inaccurate interlace in previous systems is interaction between the vertical retrace and the circuits producing the horizontal beam movement. Such interaction almost inevitably disturbs the accuracy of interlace, since successive vertical retrace movements, if correctly timed, occur in opposite phase relation to the horizontal scansion. Accordingly, a more particular object of the invention is to avoid interference between the timing of the vertical retrace and the horizontal deflection circuits.

In previous systems such interaction was avoided primarily by mutual shielding or physical separation of the circuits controlling vertical retrace and horizontal flyback. However, such shielding is made difficult, and its effectiveness is limited, by the large energies required to produce the relatively rapid horizontal flyback. The present invention, in its preferred form, completely avoids that difficulty by providing such positive control of the vertical retrace that both its initiation and its termination may be made to occur during the periods between horizontal flyback pulses. In preferred form of the invention, the vertical retrace is so timed that both its initiation and its termination occur approximately 90° out of phase with the horizontal flyback pulses. The vertical retrace following even and odd fields can then differ in phase by 180° with respect to the horizontal flyback without either starting or terminating during a flyback pulse.

The present invention typically employs a composite synchronizing waveform of conventional type; and may employ the usual amplitude responsive circuitry for stripping or separating that synchronizing waveform from the composite video signal. The timing of the horizontal sweep circuits is then typically controlled in conventional manner by the horizontal sync pulses. However, the invention replaces the usual frequency responsive circuitry by a completely different principle for distinguishing a vertical sync pulse from the horizontal sync pulses that precede and follow it.

In one of its aspects, that new principle comprises generation of a special periodic timing signal having peaks that do not coincide with the horizontal sync pulses but do coincide with the vertical sync pulse. That timing signal is combined with the composite synchronizing waveform in any desired manner such that coincidence of a peak of the timing signal with the vertical sync pulse produces a peak of higher amplitude than the remainder of the combined signal. That elevated peak is then isolated by amplitude responsive circuitry of any desired type, producing a timing pulse that has many advantageous properties for timing the vertical retrace. In the present description and in the claims, two signals or pulses are considered to "coincide" if there is a common time period during which both exist, even though they do not start or end at the same instant or have equal durations.

That general procedure for producing a timing pulse for control of the vertical retrace has the great advantage that the detailed form and also the timing of the pulse are typically determined primarily by the specially developed periodic timing signal; and, in a sense, are relatively independent of the form, amplitude and timing of the vertical sync pulse itself. That sync pulse may be considered to act as a gate, the presence of which permits one of the peaks of the timing signal to be converted into a timing pulse suitable for triggering the vertical scanning generator. But that gating action typically does not disturb either the form or the detailed timing already inherent in the timing signal. Accordingly, that gating principle permits for the first time fully effective control over the nature and detailed timing of the pulse by which the vertical retrace movement is timed.

That control is typically made possible by complete separation of two operations which in previous systems have been closely interrelated, or even unitary in nature: the separation of the vertical sync pulse from the horizontal sync pulses; and the production of an actual timing pulse in response to occurrence of a vertical sync pulse. In conventional systems those two operations may be considered to be performed in the order just stated. In accordance with the present invention, they may be considered to be performed in the opposite order. That is, in accordance with the present view of the invention, the timing pulse is first created as one of a periodic series of pulses, independently of whether a vertical sync pulse is present or not. Presence of a vertical sync pulse is then utilized to select one of the already created timing pulses for delivery to the scanning generator. That selection process does not appreciably disturb either the form or time of the selected pulse. Both of those properties may therefore be determined independently of the selection process. That novel advantage does not, of course, prevent any desired reshaping or other modification of a particular timing pulse following its selection.

In accordance with a further aspect of the invention, the described periodic timing signal preferably has a period equal to half the horizontal scanning period H, and is developed in definite timed relation to the horizontal beam movement. It may be derived, for example, by frequency doubling circuitry of any desired type, either from the horizontal sync pulses or directly from the flyback pulses that drive the horizontal flyback. For example, a resonant circuit of natural period substantially equal to $H/2$ may be excited from the flyback pulse. With a resonant circuit of reasonably high Q the even and odd oscillations are virtually identical and uniformly spaced. The even and odd timing signals then differ in phase by 180°, or $\pi$, with respect to the horizontal flyback pulses. Their actual phase relations can be adjusted accurately and conveniently, for example by any suitable type of phase shifting network, or by fine tuning of the resonant tank circuit. A preferred phase relationship is such that one group of alternate timing peaks leads the flyback pulses by approximately $\pi/2$, while the other group lags by approximately $\pi/2$. The fact that the timing pulses for successive retrace movements are selected alternately from even and from odd signal peaks then does not cause detectable irregularity of timing. All selected pulses, whether even or odd, are well spaced from the flyback pulses, avoiding objectionable interaction of the latter with the retrace timing.

The vertical sync pulse of the composite synchronizing waveform is typically substantially a square wave with duration of from about 3H to about 6H in different television systems. Hence a plurality of successive like-directed excursions of the timing signal tend to be superposed on each vertical sync pulse, leading to isolation of a corresponding plurality of vertical timing pulses at intervals of $H/2$. The vertical retrace oscillator is typically tripped by the first of those signals, the following signals having no effect.

A further feature of the invention attenuates all succeeding timing pulses relative to the first pulse of each such series. That may be accomplished, for example, by suitable shaping of the composite sync signal before combining it with the described periodic timing signal. The vertical sync pulse may be converted, for example, from its initial square wave form into a relatively sharp peak which decays exponentially. By selecting for that decay a suitable time constant, for example of the order of H, the amount of that decay may be made negligible at the time of the first coinciding timing peak, yet appreciable at subsequent peaks. The first pulse selected is therefore emphasized relative to subsequent pulses, and the latter may be completely suppressed, for example by known clipping techniques, if desired. That emphasis of a selected vertical timing pulse has the advantage of avoiding any possibility of the vertical retrace alternating between two different time relations.

A further aspect of the invention provides positive control of the duration of the vertical retrace movement. The retrace movement commonly occupies a time period of from approximately 5H to 20H. In conventional systems the duration of each retrace corresponds to a single cycle of a timing circuit, usually involving charge or discharge of a capacitance that forms part of the vertical multivibrator. The high precision required of such timing circuits to produce accurate interlace is difficult to maintain in the presence of interference and noise.

The present invention provides a periodic timing signal of relatively short period; and employs frequency dividing or counting techniques to maintain the retract period equal to a predetermined and relatively large number of cycles of that signal. In preferred form of that aspect of the invention, the timing signal has a period $H/2$ or an integral multiple thereof; and typically comprises the same periodic timing signal already described for initiating the retrace movement. If the retrace lasts 20 cycles of such a signal, for example, a given percentage irregularity of the timing action during the final count, such as may result from circuit noise, typically causes only about one twentieth of the timing error that would occur in a conventional system with single timing cycle.

A further, and more important, advantage made possible by this aspect of the invention is that every count has a definite phase relation to the horizontal flyback pulses. When that phase is properly adjusted, the retrace termination, like its initiation, occurs regularly during the intervals between flyback pulses, so that interference from the latter is completely eliminated.

The invention is capable of timing the vertical retrace in television monitors and receivers with substantially the accuracy achieved conventionally in cameras. That accuracy of retrace in cameras is ordinarily obtained, however, only by supplying separate horizontal and vertical synch signals over independent circuits from the sync generator, which is inconvenient and expensive. A further aspect of the invention permits the satisfactory operation of television cameras with synchronization by the regular composite sync signal, thus reducing the number of cables and associated gear required for each camera.

The invention is useful in systems that employ a wide variety of composite synchronizing waveforms, including, for example, the standard synchronizing waveform specified by the FCC for use in commercial television in the United States; the numerous modifications of that waveform used for such purposes as closed circuit television in the United States and commonly referred to as industrial sync; and the various waveforms used in Great Britain and based on the BBC standard. All of those illustrative composite synchronizing waveforms comprise periodic horizontal sync pulses with period H and vertical sync pulses with period equal to an odd integral multiple of $H/2$, typically $525H/2$, where H is the horizontal scanning period. The horizontal and vertical sync pulses typically have equal amplitude and common polarity. The duration of the horizointal sync pulses is specified as 0.04H in the FCC system and may be as large as about 0.2H in other systems; and the duration of the vertical sync pulses is usually from 3H to 6H.

The present invention has the further great advantage of being effective whether or not the vertical sync pulses are serrated, as is true of the FCC and BBC systems, but is not always true of the so-called industrial sync; and whether or not the vertical sync pulsse are preceded and followed by equalizing pulses with period $H/2$, as is true of substantially all systems in the United States, but not of the BBC standard.

The conventional terms "horizontal" and "vertical" are used in the present description and claims to refer to the line and frame scanning movements, respectively, without implying any limitation upon the actual orientation of the equipment.

A full understanding of the invention and of its further objects and advantages will be had from the following description of an illustrative system by which it may be carried out. The particulars of that description and of the accompanying drawings which form a part of it are intended only for illustration, and not as a limitation upon the scope of the invention, which is defined in the appended claims.

Figure 2:
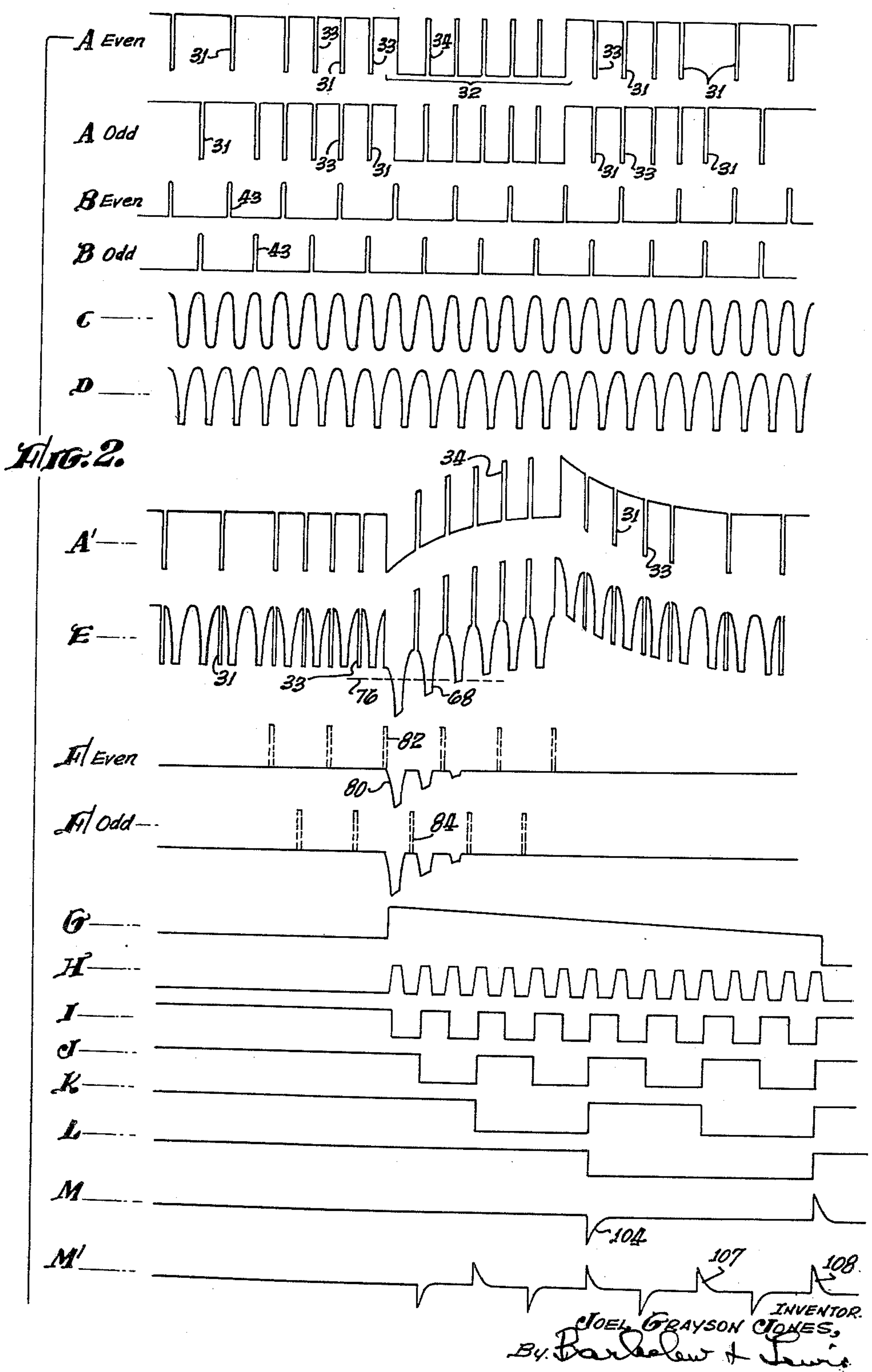

In the drawings:

FIG. 1 is a schematic diagram representing an illustrative embodiment of the invention; and FIG. 2 is a diagram representing typical waveforms at designated points of the system of FIG. 1.

In FIG. 1, a cathode ray tube is represented at 10 with display screen 12 and with horizontal and vertical magnetic deflection coils indicated schematically at 16 and 18, respectively. Electrostatic deflection may be employed alternatively, with appropriate modification of the rest of the system. A composite video signal, comprising both picture and synchronizing signals, is typically supplied to the video amplifier 20 via the line 22, either from a suitable cable, as in the case of closed circuit television, or via carrier wave transmission and suitable receiving and demodulating means, not shown. The amplified video signal is supplied via the line 15 to a suitable control electrode, indicated at 14, and controls the intensity of the cathode ray beam in tube 10 in the usual manner.

The video signal is also supplied to the amplitude responsive sync separator or stripper 26, which isolates the composite sync signal from the picture signal and supplies it on the line 28 for time control of the deflection circuits of the cathode ray tube. Alternatively, the composite sync signal may be supplied to line 28 independently of the picture signal, for example via an individual cable from the sending station. Moreover, tube 10 may be considered to represent a camera tube with output picture signal on line 15. The composite synchronizing signal is then typically supplied to line 28 from the usual sync generator via a single cable.

An illustrative form of composite sync signal A is shown in FIG. 2, comprising the negative going horizontal sync pulses 31 of period H, and the vertical sync pulses 32 of typical period 525H/2. Since that vertical deflection period is an odd multiple of $H/2$, the horizontal sync pulses are shifted $H/2$ relative to the odd vertical sync pulses as compared to the even vertical pulses. The waveform shown also includes the equalizing pulses 33, of which only two are shown on each side of vertical sync pulse 32, spaced 180° out of phase with the horizontal sync pulses; and the serrations 34, which interrupt vertical sync pulse 32 at intervals of $H/2$. Serrations 34 and equalizing pulses 33 are required in certain previous systems, but may be either present or absent in systems utilizing the present invention.

The horizontal scanning generator 40 may be of conventional type, and supplies to horizontal deflection coils 16 a sawtooth current waveform of period H. The deflection waveform comprises a forward scanning, or trace, portion of relatively small slope, and a retrace portion of relatively steep slope and correspondingly short duration. The retrace portion, or flyback, typically occupies a period of approximately $H/8$, and the trace approximately $7H/8$. Scanning generator 40 typically comprises an oscillator, such as a free-running multivibrator or blocking oscillator, having two conditions of unstable equilibrium with respective time constants equal to the desired retrace period and slightly longer than the desired trace period, respectively. The oscillator is triggered from its trace condition to its retrace condition by the horizontal sync pulses from line 28, thus maintaining it in synchronism with those pulses and in such phase relation that each retrace period immediately follows a horizontal sync pulse. The oscillator output is suitably amplified and shaped in known manner for supply to deflection coils 16.

When equalizing pulses 33 and serrations 34 are present, the former do not affect the horizontal scanning oscillator, being too far out of phase with its normal period. It continues to be triggered, however, during vertical sync pulse 32 by the alternate serrations 34 that are in phase with the horizontal sync pulses 31. If serrations 34 are absent, the horizontal scanning action continues at substantially correct frequency during the vertical sync pulse, due to the well known automatic frequency control of conventional horizontal sync systems.

The vertical scanning generator 46 typically comprises an oscillator 47 which develops a sawtooth signal having approximately the waveform required for current to the vertical deflection coils 18. That signal is then amplified and shaped in known manner, as by the output amplifier 48. In conventional systems the oscillator typically comprises a multivibrator having one condition, which may be stable, corresponding to the trace period of the vertical beam movement, and having another condition which is unstable and corresponds to the vertical retrace. The multivibrator is triggered from trace to retrace condition by a relatively ill-defined vertical sync signal; and the duration of the retrace is then determined entirely by the time constant of the unstable state of the multivibrator.

In accordance with the present invention, a sharp and accurately timed signal is obtained for triggering the vertical scanning generator from trace to retrace condition; and a time signal of similar quality is preferably also provided for positively returning the generator to trace condition. Hence vertical deflection multivibrator 47 may be of bi-stable type, being triggered in both directions solely by the described time signals; or one or both of its states may be unstable, with such period that it is positively triggered by the time signal shortly before it would shift spontaneously.

As illustratively shown in FIG. 1, the signal generator 50 develops on the line 53 a periodic timing signal of period $H/2$ and frequency $2f_h$, where H and $f_h$ represent the period and frequency of horizontal scan. That timing signal may be developed in any desired manner, for example by doubling the frequency of an available signal of frequency $f_h$. The horizontal sync pulses 31 of the composite synchronizing waveform A represent one such signal, which might be utilized to control signal generator 50. In the present embodiment, however, a control signal of period H is taken via the line 42 from horizontal scanning generator 40, and comprises a substantially square wave corresponding to the horizontal flyback pulses developed by that generator. Such a signal of the form typically shown at B in FIG. 2, can be derived, for example, from one of the plates of the horizontal scanning multivibrator, with suitable inversion if required. The leading edges of its peaks 43 substantially coincide with those of the horizontal sync pulses 31, though the peak duration may be slightly different. That signal B is supplied via the current limiting resistor R1 and the blocking capacitance C1 for control of signal generator 50.

Signal generator 50 may comprise, for example, a free-running oscillator of any desired type having a normal period of approximately $H/2$ and capable of being synchronized by means of a signal of twice that period. As shown, signal generator 50 is a frequency doubling circuit comprising a resonant tank circuit or ringing coil of high Q tuned to approximately twice the horizontal scan frequency. That ringing coil comprises the parallel-connected choke coil 51 and capacitance C2. Means are preferably provided for fine tuning the ringing circuit, as by the indicated adjustment of the inductance of coil 51. The output on line 53 from signal generator 50 is typically a sine wave, as represented at C in FIG. 2, having alternate peaks of one polarity, shown positive, approximately in phase with the pulses of signal B. The peaks of opposite polarity, negative in the present instance, therefore alternately lead and lag the horizontal flyback pulses by a phase angle different from $\pi$ and approximately equal to $\pi/2$. That phase relation may be adjusted conveniently in either direction through an appreciable range by adjustment of the natural frequency of the ringing circuit slightly above or below $2f_h$. Additional phase adjusting circuits of known type may be provided if desired.

In the described system the timing signal is obtained by doubling the frequency of a locally generated signal that is stabilized by automatic frequency control, that local signal being typically the regular horizontal flyback pulses from the stabilized horizontal scanning generator. Under that condition, the timing signal directly shares in the well-known stability developed by the automatic frequency control. The horizontal scanning generator, with its conventional automatic frequency control system, and the frequency doubler comprise together a local frequency-stabilized oscillator system for generating a continuous periodic timing signal of period $H/2$.

The timing signal C may be used directly, if desired, but it is usually preferable to modify its form, especially to square the peaks that are out of phase with the horizontal flyback pulses and steepen their leading edges.

Such pulse shaping may be accomplished by circuitry of any desired type, such as a Schmitt trigger, multivibrator, overdriven amplifier or diode slicer, for example. Such shaping circuitry is represented in the present embodiment at 52, comprising the cathode follower vacuum tube V1, which is driven beyond cutoff by the negative peaks of signal C, clipping those peaks close to ground potential. Tube V1 also provides impedance isolation to avoid undue loading of ringing circuit 50. The resulting timing signal D on the line 55 is of the form shown illustratively in FIG. 2.

Timing signal D is combined with the composite sync-signal A, typically by summing, as in the adding circuit represented at 60 and comprising the resistances R7 and R8. The composite sync signal is supplied to adder 60 from line 28 via the line 29 and the impedance isolating cathode follower tube V2 with cathode resistance R5. The signal may be used directly in that form, shown typically at A. However, in accordance with a further aspect of the invention, the signal A is preferably first modified in any suitable manner that enhances the initial portion of vertical sync pulse 32 relative to the following portion of that pulse. That general function may be accomplished by shaping circuitry of many different types. Such circuitry is illustratively represented at 66, comprising the series resistance R9 and capacitance C3, acting as a high pass filter and having a time constant of the order of H. The output of filter 66 is of the general form indicated at A' in FIG. 2. That modified composite sync signal is supplied to one input of adder 60, and timing signal D to the other. The output E on the line 62 from the junction of R7 and R8 then represents substantially the sum of the two input signals. Whereas resistances R7 and R8 are shown for clarity of explanation as separate circuit elements, their summing function may be performed partially or wholly by other components. In particular, when tubes V1 and V2 are driven to cutoff at the negative peaks of signals D and A, respectively, resistances R7 and R8 may be omitted, and resistances R4 and R5 may be viewed as performing a summing function.

The combined signal on line 62 has the general form represented at E in FIG. 2. That relatively complex waveform will be seen to comprise two distinct portions, characterized by distinctly different amplitudes. The horizontal sync pulses 31 of composite synchronizing signal A' coincide substantially with oppositely directed excursions of timing signal D, so that the two signals tend to cancel rather than add. The same is true of equalizing pulses 33, if present. Hence the amplitude of the combined signal is substantially no greater than that of its components throughout most of a field period. However, vertical sync pulses 32 coincide with like directed excursions of the timing wave D, producing a combined signal of amplitude substantially equal to the sum of the amplitudes of its components. The resulting voltage peaks 68, of negative polarity in the present instance, stand out clearly from the remainder of the combined signal. Those peaks 68 can therefore be readily isolated by suitable amplitude responsive means of any desired type.

Amplitude separator 70 is illustratively shown as a diode clipper, comprising the diode 72 and the voltage dividing resistances R9 and R10. Those resistances set the normal level of the output line 74 to correspond to the dashed line 76 shown on waveform E. Clipper 70 then transmits only the peaks of that waveform that are more negative than 76. The resulting output signal on line 74 is then of the general form shown at F in FIG. 2. That waveform may be further amplified, shaped, or otherwise modified as desired; or may be supplied directly, as in the present embodiment, to vertical scanning generator 46 as a vertical sync signal for triggering vertical oscillator 47 from trace to retrace condition. The negative going sync signal F may, for example, be applied to the grid of the first tube of multivibrator 47, which is conductive during the trace phase of the vertical beam movement, thus shifting the multivibrator to retrace condition.

Under all normal conditions only the first pulse 80 of signal F is effective, even if the remaining pulses are of equal amplitude, as is the case when shaping circuit 66, or its equivalent, is omitted. Hence even under that condition clipping circuit 70 effectively selects a unique one of the timing pulses to act as control signal for deflection multivibrator 47, that selected pulse being the first of the sequence of pulses 80 isolated by the clipper. The illustrated enhancement of the first pulse and the relative attenuation of successive pulses, however, tends to prevent the latter from erratically triggering the retrace if the vertical oscillator, for example, is improperly adjusted. For clarity of explanation, the vertical sync signal provided by the present system will be considered as only the first pulse 80 of waveform F.

That signal will be seen to have many desirable properties for timing the vertical retrace. It has a steep leading edge, which rises to full amplitude, for example, in a very small fraction of the period $H/2$. Not only is the leading edge steep, but it occurs in definite phase relation to the horizontal flyback pulses represented at B. That phase relation may be adjusted accurately by means of variable inductance 51, as already described, or by any desired supplementary phase shifting circuits, such as RC networks and the like, which may be inserted in line 74 and act directly on the final waveform F.

In systems providing interlace, the time relation between vertical sync signal 80 and the two horizontal flyback pulses which precede and follow it is different for even and odd scanning fields. Those alternating phase relations for even and odd retrace are represented just above the waveform F in FIG. 2. The flyback pulses for even fields, corresponding to even synchronizing waveform A, are shown at 82; for odd fields at 84. Vertical sync signal 80 will be seen to be out of phase with the flyback pulses under both those conditions, the phase difference having a value between 0 and $\pi$, and typically approximately equal to $\pi/2$ in each case, but in opposite sense. The signals 80 for successive scanning fields therefore alternately lead and lag the horizontal flyback pulses by approximately ¼ cycle of the latter, or a time interval of approximately $H/4$. Hence, the action of pulse 80 initiating the vertical retrace occurs at a time that is spaced between adjacent flyback pulses. At that time, there is maximum freedom from any possibility of troublesome interaction between the vertical and horizontal scanning systems.

Whereas it is ordinarily preferred that the timing signal that is combined with the composite synchronizing signal have a period $H/2$, that is not neessary. For example, ringing coil 50 may be tuned to any multiple of $H/2$ that is a factor of the vertical scanning period and that does not exceed the length of a vertical sync pulse 32. Thus, if the vertical scanning period has the typical value of $525H/2$, and if the vertical sync pulse lasts $3H$, the ringing coil period may be $3H/2$ or $5H/2$. Suitable supplementary pulse shaping and phase adjusting circuitry of known type may then be provided if necessary to produce a sharp timing pulse that is substantially $\pi/2$ out of phase with the flyback pulses. When such a timing signal is combined with the composite synchronizing signal, every vertical sync pulse has superposed on it at least one of the timing pulses, the position of which is the same for even and odd fields. However, unless further control is provided, the timing pulses may appear at different positions on the vertical sync pulse, depending upon the phase of initial excitation of the ringing coil or its equivalent. For a timing signal of period $3H/2$, there are three such alternative positions, for a period of $5H/2$ there are five positions, each corresponding to slightly different vertical positions of the picture relative to the scanning pattern. To make those positions equivalent at amplitude selector 70 or its equivalent, shaping of the composite synchronizing signal, as at 66, is omitted; but appearance of two peaks of equal intensity in the final sync signal on line 94 is unlikely to cause trouble since they are separated by $3H/2$ or more.

The system of FIG. 1 also includes illustrative means for supplying to vertical scanning generator 46 an accurate timing signal for terminating the retrace and returning the oscillator to trace condition. In the present embodiment, timing signal D is supplied from line 55 via the line 92 to a gating circuit indicated schematically at 90. Gating circuit 90 is controlled in action by a control signal. That control signal is typically essentially a square wave which corresponds to retrace condition of vertical scanning generator 46, and may be derived, for example, from the output of vertical multivibrator 47. The control signal is then of the general form shown at G. In presence of that control signal, gate 90 transmits the input signal D from line 92 to the output line 96 typically inverting the polarity; while in absence of the control pulse no signal is transmitted. Many different types of gating circuit for performing that function are well known, and need not be described in detail. The train of timing pulses delivered to line 96 by the gate is shown typically at H in FIG. 2, with positive polarity for illustration, though either polarity may be obtained, depending in known manner upon the detailed gating circuitry selected.

That periodic pulse train H is supplied as input to a frequency dividing circuit or pulse counter represented schematically at 100. Counter 100 counts a definite selected number N of input pulses and delivers an output pulse on the line 102 in response to the last count. That output pulse is supplied to vertical scanning generator 46 in suitable manner to trigger return of the multivibrator to trace condition. For example, a positive going output pulse, such as pulse 106 of waveform M, may be applied to the grid of the first tube of multivibrator 47, returning that tube to conductive state and thereby terminating the retrace. In that way the duration of the vertical retrace is positively and accurately maintained equal to N times the period of the pulses supplied to counter 100.

Many different types of circuit are known for performing the described counting function, and can be made to divide by any desired number that may be selected for a particular system. In normal television practice, if the period of the input pulses is $H/2$, the desired count will usually be between 10 and 30. A particularly convenient value for N is 16, since counter 100 may then comprise a succession of scale-of-two counters connected in series, and followed by a differentiating circuit of known type. Each scale-of-two counter typically has two alternative conditions and is shifted from the existing condition to the other by each positive-going input wavefront. Illustrative outputs from the respective counters of such a chain are represented at I, J, K and L. Differentiation of square wave L produces a final output on line 102 of the form shown at M. The negative pulse 104 is typically ineffective, or may be eliminated in known manner; whereas the positive pulse 106 triggers return of the vertical multivibrator to trace condition. That action also terminates gate control pulse G.

The described procedure may be viewed as complete frequency division, since it divides by the full number N of counts representing the retrace duration, and delivers only a single pulse 106 of effective polarity. That pulse, with suitable amplification, if required, can positively control termination of the vertical retrace without aid of any other timing mechanism. Hence, the retrace condition of the vertical multivibrator may be stable, if desired.

If the vertical multivibrator is unstable in retrace condition, as is true of conventional systems, frequency dividing circuit 100 is not required to divide by the total number N of cycles desired for the retrace duration, but may, for example, divide by an integral submultiple of N. The frequency dividing circuitry may then be somewhat simplified. For example, if the output J from the second scale-of-two counter is differentiated, a series of four positive and four negative pulses is obtained, as represented at M'. With suitable selection of the circuit constants, the vertical multivibrator may be made responsive to a switching pulse at the time of the last positive pulse 108 of series M', but insensitive to the earlier pulses such as 107. With that arrangement, the two scale-of-two counters effectively divide by four, which may be described as partial division; while the vertical multivibrator itself may be considered to perform a further division by four, completing an overall division by 16, as before.

For maximum reliability it is preferred to use a gating and counting system such as is illustrated in FIG. 1, or an intermediate system utilizing partial division as indicated at M' in FIG. 2.

If desired, however, the entire burden of frequency division may be placed upon vertical multivibrator 47 or its equivalent by supplying to it as retrace-terminating signal on line 102 an entire series of pulses such as waveform D, for example. The time constant of the multivibrator must then be controlled sufficiently closely to put it into sensitive condition to be triggered always by the Nth pulse, say, following the start of retrace. That requirement is still far less stringent, however, than is normally made upon the multivibrator timing circuit in previous systems, since the precise termination of retrace is timed by the Nth pulse of train D. Such a system provides the outstanding advantage, already described, of terminating the retrace in adjustable and positively defined time relation to the horizontal flyback pulses.

It will be recognized that the arrangement of gating circuit 90 in the system of FIG. 1 is illustrative of many different configurations that perform an equivalent function. For example, pulses such as D may be supplied continuously to a frequency dividing or counting circuit which is normally disabled, as by a suitable biasing voltage. A gating signal such as G may then be applied in such a way as to counteract that bias and render the counter operative during the signal. Such an arrangement may be considered to incorporate gate 90 as a part of counter 100.

As a further illustration, a timing signal may be supplied to counter 100 from a special periodic signal generator of conventional type, which is normally disabled as by a biasing voltage and is rendered operative only during application of a gating pulse such as G. That arrangement may be considered to incorporate gate 90 in the signal generator. In such a system, synchronizing means of any suitable type are preferably provided for establishing a definite phase relation between the signal generated during the gating pulse and the horizontal flyback pulses. What ever the detailed structure of the gating mechanism, it causes initiation of the counting operation in direct time relation to the start of the vertical retrace.

Many of the described advantages obtainable by utilizing frequency division in developing a timing signal for terminating the vertical retrace do not require that the periodic signal supplied to the counter have any particular period, so long as it is short compared to the retrace duration. Even with a signal of arbitrary period and phase, frequency division decreases the magnitude of the timing errors that are likely to result from erratic noise or interference.

Another aspect of the present system for timing retrace termination results from maintaining a definite time relation between the timing signal and the horizontal flyback pulses. That is accomplished in the system of FIG. 1 by deriving the timing signal from a periodic signal which is developed under continuous time control of the horizontal scan. That control establishes a definite time relation between the retrace termination and the horizontal flyback independently of the retrace initiation.

Alternatively, the time relation between retrace termination and flyback can be made dependent upon the retrace initiation, the latter being controlled, for example, in the manner already described. For example, a free-running oscillator having a period equal to H or an integral multiple of H may be turned on by a gating control pulse such as G. By terminating the retrace after a selected number of cycles of such a signal, the retrace termination has the same phase relation to the flyback pulses as the retrace initiation. The same is essentially true if the generated signal has a period equal to any odd multiple of $H/2$, since successive cycles of that signal alternate in phase with respect to the flyback in the same way that the retrace initiation alternates on successive fields. By initiating retrace approximately $\pi/2$ out of phase with the flyback, in the manner already described, and accurately maintaining the retrace duration equal to any integral multiple of $H/2$, the retrace control action always occurs in absence of a horizontal flyback pulse.

The invention has been described with particular reference to television scanning systems in which the horizontal lines of two successive fields are interlaced. The same principles of operation may be applied, with suitable modifications of detail, to systems in which the lines of three or more successive fields are interlaced. For example, for three-fold interlace the period of timing signal D is preferably $H/3$. Its phase angle with respect to the horizontal flyback pulses then preferably has a value different from 0, $2\pi/3$ and $5\pi/3$, and typically approximately equal, for succesive fields, to $\pi/3$, $\pi$ and $5\pi/3$.

Many additional modifications may be made in the particulars of the illustrative system that has been described without departing from the proper scope of the present invention, which is defined by the appended claims.

I claim:

1. In a television scanning system receiving a composite synchronizing signal that comprises horizontal sync pulses of period H and vertical sync pulses of such period as to produce line interlace; means for timing the vertical retrace of said system, comprising the combination of local oscillating means for producing a continuous periodic timing signal having peaks of one polarity that alternately lead and lag the horizontal sync pulses by approximately $H/4$, means for summing said peaks of the timing signal and the composite synchronizing signal, means for clipping the summed signals to produce a control signal in response to coincidence of a vertical sync pulse and a timing signal peak, and means for initiating a vertical retrace in definite time relation to the control signal.

2. In a television scanning system receiving a composite synchronizing signal that comprises horizontal sync pulses of period H and vertical sync pulses of at least $H/2$ duration and of such period as to produce line interlace; means for timing the vertical retrace of said system, comprising the combination of a ringing coil having a period of substantially $H/2$, means for exciting the ringing coil in definite time relation to the horizontal sync pulses, means controlled by the ringing coil for producing a timing signal only in presence of a vertical sync pulse, and means for initiating the vertical retrace under control of the timing signal.

3. In a television scanning system, means for initiating a vertical retrace pulse, means for producing a periodic signal having a period short compared to the duration of the vertical retrace, means for counting a predetermined number of cycles of said signal following initiation of the vertical retrace pulse, and means for terminating the vertical retrace pulse under control of said counting means.

4. In a television scanning system that comprises stabilized oscillator means for producing periodic horizontal flyback pulses with period H, and means for initiating periodic vertical retrace pulses with period equal to an odd integral multiple of $H/2$; means for timing the retrace pulses, comprising means for producing a continuous periodic timing signal having a period equal to an integral multiple of $H/2$, means responsive to said oscillator means for maintaining the timing signal in definite time relation to the horizontal flyback pulses, and means for terminating the vertical retrace pulse in response to a selected cycle of the timing signal.

5. In a television scanning system that comprises stabilized oscillator means for producing periodic horizontal flyback pulses with period H in response to horizontal sync signals, and means for initiating periodic vertical retrace pulses with period equal to an odd integral multiple of $H/2$ in response to vertical sync signals; means for timing the vertical retrace pulses, comprising the combination of means controlled in time by said oscillator means for producing a continuous periodic timing signal of period equal to an integral multiple of $H/2$, counting means actuated in timed relation to the start of the retrace pulse and acting to produce a control signal after a predetermined number of cycles of said timing signal, and means for terminating the retrace pulse in response to the control signal.

6. In a television scanning system that comprises means for producing periodic horizontal flyback pulses with period H in response to horizontal sync signals, and means for producing periodic vertical retrace pulses with period equal to an odd integral multiple of $H/2$ in response to vertical syn signals; means for timing the vertical retrace pulses, comprising the combination of means for initiating a vertical retrace pulse in response to a vertical sync signal at a time that is spaced from the horizontal flyback pulses by approximately $H/4$, and timing means acting to terminate the vertical retrace pulse after a duration that is substantially equal to an integral multiple of $H/2$.

7. In a television scanning system receiving a composite synchronizing signal that comprises vertical sync pulses and horizontal sync pulses; means for timing the vertical retrace of said system, comprising the combination of means for producing a periodic timing signal, means for combining the timing signal and the composite synchronizing signal, each vertical sync pulse coinciding with a plurality of like directed excursions of the timing signal, means for enhancing the first of said coincidences to develop a control signal, and means for timing the vertical retrace in response to said control signal.

8. In a television scanning system receiving a composite synchronizing signal that comprises vertical sync pulses and horizontal sync pulses; means for timing the vertical retrace of said system, comprising the combination of means for producing a continuous periodic timing signal having a period shorter than the duration of a vertical sync pulse, means for filtering the composite synchronizing signal to attentuate each body of the vertical sync pulse relative to the initial portion thereof, means for combining the timing signal and the filtered composite synchronizing signal, said initial portion of each vertical sync pulse coinciding with a like directed excursion of the timing signal, means for developing a control signal in response to said coincidence of vertical sync pulse portion and timing signal excursion, and means for timing the vertical retrace in response to said control signal.

9. The combination defined in claim 8, wherein said means for filtering the composite synchronizing signal comprise high pass filter means having a time constant of the order of the period between horizontal sync pulses.

10. In a television scanning system receiving a composite synchronizing signal that comprises horizontal sync pulses of period H and vertical sync pulses; means for timing the vertical retrace of said system, comprising the combination of means for generating continuously a periodic timing signal of uniform period, the peaks of one polarity of the periodic timing signal being spaced in time from the horizontal sync pulses by at least approximately $H/4$, and at least one of said peaks coinciding with each vertical sync pulse in one to one relation, means for developing a control signal in response to coincidence of a timing signal peak of said one polarity and a vertical sync pulse, and means for timing the vertical retrace in response to said control signal.

11. In a television scanning system receiving a composite synchronizing signal that comprises horizontal sync pulses of period H and vertical sync pulses of such period as to produce line interlace; means for timing the vertical retrace of said system, comprising the combination of means including local oscillating means and acting under time control of the horizontal sync pulses to generate continuously a periodic timing signal of period equal to an odd multiple of $H/2$, means for selecting a pulse of the timing signal that coincides with a vertical sync pulse of the composite synchronizing signal, and means for producing a vertical retrace pulse under time control of the selected timing signal pulse.

12. In a television scanning system receiving a composite synchronizing signal that comprises horizontal sync pulses of period H and vertical sync pulses of such period as to produce line interlace; the combination of stabilized oscillating means responsive to the horizontal sync pulses and developing a continuous periodic signal of period H, means for doubling the frequency of said signal to produce a continuous periodic timing signal of period $H/2$, means for selecting a pulse of said timing signal that coincides with a vertical sync pulse of the composite synchronizing signal, and means for producing a vertical retrace pulse under time control of the selected timing signal pulse.

13. In a television scanning system that receives a composite synchronizing signal that comprises horizontal sync pulses of period H and vertical sync pulses of period equal to an odd integral multiple of $H/2$, said system comprising stabilized oscillating means for producing periodic horizontal flyback pulses of period H under control of the horizontal sync pulses; means for timing the vertical retrace of said system, comprising the combination of means acting under time control of said oscillating means for producing a continuous periodic timing signal having a period that is a factor of the vertical sync pulse period, is less than the duration of each vertical sync pulse and is equal to an odd integral multiple of $H/2$, means for selecting a pulse of the timing signal that coincides with a vertical sync pulse of the composite synchronizing signal, and means for producing a vertical retrace pulse under time control of the selected timing signal pulse.

14. In a television scanning system that receives a composite synchronizing signal that comprises horizontal sync pulses of period H and vertical sync pulses of period equal to an odd integral multiple of $H/2$, said system comprising stabilized oscillating means for producing periodic horizontal flyback pulses of period H under control of the horizontal sync pulses; means for timing the vertical retrace of said system, comprising the combination of second oscillating means having a natural period of substantially $H/2$, means responsive to the first said oscillating means for maintaining a definite phase relation between the oscillations of the second oscillating means and the horizontal flyback pulses, means for selecting an oscillation of the second oscillating means in definite timed relation to a vertical sync pulse, and means for producing a vertical retrace pulse under time control of the selected oscillation.

15. In a television scanning system receiving a composite synchronizing signal that comprises horizontal sync pulses of period H and vertical sync pulses of such period as to produce line interlace; means for timing the vertical retrace of said system, comprising the combination of means for generating continuously a periodic timing signal having a period equal to $H/2$, means operable to vary the phase relation between the timing signal and the horizontal sync pulses of the composite synchronizing signal to make pulses of one polarity of the timing signal alternately lead and lag the horizontal sync pulses by substantially $H/4$, means for selecting one of said signal pulses that coincides with a vertical sync pulse, and means for producing a vertical retrace pulse under time control of the selected signal pulse.

16. In a television scanning system receiving a composite synchronizing signal that comprises horizontal sync pulses of period H and vertical sync pulses of period equal to an odd integral multiple of $H/2$; means for timing the vertical retrace of said system, comprising the combination of local oscillating circuit means having a natural period of approximately $H/2$, means for supplying to said circuit means a control signal derived from the horizontal sync pulses of the composite synchronizing signal to cause the circuit means to oscillate with period $H/2$, means for adjustably varying the natural period of the circuit means to modify the phase relation between its oscillations and the timing signal, means for deriving from the oscillating circuit means a timing pulse that coincides with a vertical sync pulse of the composite synchronizing signal, and means for producing a vertical retrace pulse under time control of the timing pulse.

17. In a television scanning system that comprises means for producing periodic horizontal flyback pulses with period H in response to horizontal sync signals, and means for initiating periodic vertical retrace pulses with period equal to an odd integral multiple of $H/2$ in response to vertical sync signals; means for timing the vertical retrace pulses, comprising the combination of means controlled in time by the horizontal sync signals for producing a continuous periodic timing signal of period equal to an integral multiple of $H/2$, frequency dividing means for producing an output pulse in response to a predetermined number of input pulses, gating means for supplying timing signal peaks as input pulses to the frequency dividing means only during a vertical retrace pulse, and means for terminating the vertical retrace pulses in timed relation to output pulses of the frequency dividing means.

18. In a television scanning system that receives a composite synchronizing signal that comprises horizontal sync pulses and vertical sync pulses; means for timing the vertical retrace of said system, comprising the combination of stabilized oscillating means acting under time control of the horizontal sync pulses to produce a continuous series of periodic timing signals of such period that each vertical sync pulse coincides with at least one timing signal, means acting to produce a control signal in response to coincidence of a timing signal and a vertical sync pulse, and means for timing the vertical retrace under time control of the control signal.

19. The combination defined in claim 18, wherein the horizontal sync pulses have period H and the vertical sync pulses have such period as to produce N-fold line interlace, the period of said timing signals being equal to $H/N$.

20. In a television scanning system that receives a composite synchronizing signal that comprises horizontal sync pulses and vertical sync pulses, said system comprising stabilized ocillating means for producing periodic horizontal flyback pulses under control of the horizontal sync pulses; means for timing the vertical retrace of said system, comprising the combination of means acting under time control of said oscillating means for producing a periodic series of timing signals that are spaced in time from the flyback pulses, each vertical sync pulse coinciding with at least one timing signal, and means for producing vertical retrace in response to coincidence of a timing signal and a vertical sync pulse.

References Cited in the file of this patent

UNITED STATES PATENTS

| | | |
|---|---|---|
| 2,668,872 | Harrison | Feb. 9, 1954 |
| 2,733,293 | Neumann | Jan. 31, 1956 |